US011917407B2

United States Patent
Harding et al.

(10) Patent No.: US 11,917,407 B2
(45) Date of Patent: Feb. 27, 2024

(54) KEY MATCHING FOR EAPOL HANDSHAKE USING DISTRIBUTED COMPUTING

(71) Applicant: ELEVEN SOFTWARE INC., Portland, OR (US)

(72) Inventors: Muir Lee Harding, Lake Oswego, OR (US); Benjamin Corliss, Portland, OR (US); Sorawis Nilparuk, Portland, OR (US)

(73) Assignee: ELEVEN SOFTWARE INC., Portland, OR (US)

( * ) Notice: Subject to any disclaimer, the term of this patent is extended or adjusted under 35 U.S.C. 154(b) by 171 days.

(21) Appl. No.: 17/410,933

(22) Filed: Aug. 24, 2021

(65) Prior Publication Data

US 2022/0060899 A1 Feb. 24, 2022

Related U.S. Application Data

(60) Provisional application No. 63/069,553, filed on Aug. 24, 2020.

(51) Int. Cl.
  *H04L 29/06* (2006.01)
  *H04W 12/069* (2021.01)

(52) U.S. Cl.
  CPC ................ *H04W 12/069* (2021.01)

(58) Field of Classification Search
  CPC ..... H04L 9/3263; H04L 9/0838; H04L 63/06; H04L 63/08; H04L 63/0823; H04W 12/069
  See application file for complete search history.

(56) References Cited

U.S. PATENT DOCUMENTS

| | | | |
|---|---|---|---|
| 9,679,155 B1 * | 6/2017 | Grubbs | G06F 21/6227 |
| 10,516,532 B2 * | 12/2019 | Taub | H04L 9/0841 |
| 11,132,367 B1 * | 9/2021 | Chud | G06F 16/24554 |
| 2004/0019786 A1 | 1/2004 | Zorn | |
| 2005/0102291 A1 | 5/2005 | Czuchry, Jr. | |
| 2006/0083200 A1 | 4/2006 | Emeott | |
| 2006/0107050 A1 | 5/2006 | Shih | |
| 2007/0110245 A1 | 5/2007 | Sood | |
| 2008/0046732 A1 * | 2/2008 | Fu | H04L 9/083 726/4 |
| 2008/0063204 A1 * | 3/2008 | Braskich | H04L 9/0822 380/270 |
| 2008/0065884 A1 * | 3/2008 | Emeott | H04L 9/0838 713/168 |
| 2009/0210710 A1 | 8/2009 | Zheng | |
| 2013/0179943 A1 | 7/2013 | Sun | |
| 2014/0164763 A1 | 6/2014 | Cherian | |
| 2017/0230824 A1 | 8/2017 | Li | |
| 2019/0268149 A1 * | 8/2019 | Kariv | H04L 9/0897 |
| 2020/0195427 A1 * | 6/2020 | Beck | H04L 9/0866 |
| 2021/0099873 A1 * | 4/2021 | Windsor | H04L 63/0892 |

OTHER PUBLICATIONS

International Search Report and Written Opinion for PCT/US2021/047386 dated Jan. 6, 2022; 9 pages.

* cited by examiner

*Primary Examiner* — Joseph P Hirl
*Assistant Examiner* — Chi D Nguy
(74) *Attorney, Agent, or Firm* — Schwabe, Williamson & Wyatt, PC

(57) ABSTRACT

Embodiments herein relate to the field of communications, and more particularly to key matching for extensible authentication protocol over local area network (EAPOL) handshaking using distributed computing. Other embodiments may be described and claimed.

23 Claims, 9 Drawing Sheets

500

Receiving a match request from an access point of a local area network (LAN) as part of an extensible authentication protocol over LAN (EAPOL) process associated with a client device, the match request including an offered key provided by the client device, a station nonce (SNonce) value generated by the client device, and an access point nonce (ANonce) value generated by the access point
502

Determining a number of keys that are potentially valid for authentication with the LAN
504

Determining indexing information based on the number of keys, the indexing information to allocate the keys into a plurality of partitions based on a portion of the respective keys
506

Sending the offered key, the indexing information for the respective partitions, the SNonce value, and the ANonce value to a plurality of computation elements to perform matching with the respective partitions of keys
508

Receiving, from a first computation element from the plurality of computation elements, an indication of a match
510

FIGURE 5A

KEY MATCHING FOR EAPOL HANDSHAKE USING DISTRIBUTED COMPUTING

RELATED APPLICATION

This application claims priority to U.S. Provisional Patent Application No. 63/069,553 filed Aug. 24, 2020 and entitled "KEY MATCHING FOR EAPOL HANDSHAKE USING DISTRIBUTED COMPUTING," the entire disclosure of which is incorporated by reference in its entirety.

TECHNICAL FIELD

Embodiments herein relate to the field of communications, and more particularly to key matching for extensible authentication protocol over local area network (EAPOL) handshake using distributed computing.

BACKGROUND

In local area networks (LANs), including wireless local area network (WLANs) and/or wired LANs, a client device (e.g., referred to as a supplicant) authenticates with an access point using extensible authentication protocol over LAN (EAPOL) four-way handshake process.

BRIEF DESCRIPTION OF THE DRAWINGS

Embodiments will be readily understood by the following detailed description in conjunction with the accompanying drawings and the appended claims. Embodiments are illustrated by way of example and not by way of limitation in the figures of the accompanying drawings.

FIGS. 5A, 5B, and 5C illustrate examples of processes in accordance with various embodiments.

DETAILED DESCRIPTION OF DISCLOSED EMBODIMENTS

Figure 1:
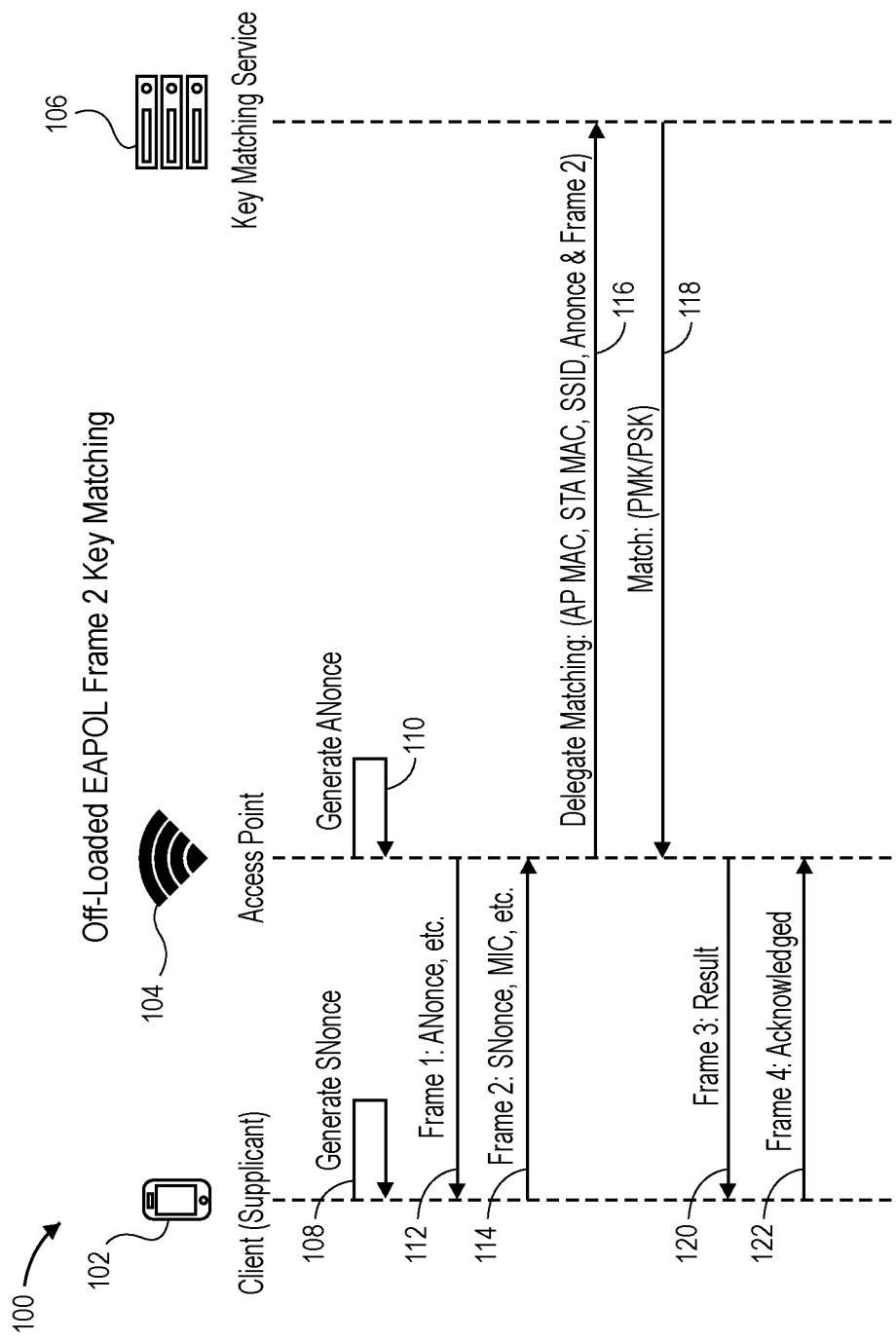
FIG. 1 illustrates an example of an EAPOL four-way handshake process in accordance with various embodiments.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense.

Various operations may be described as multiple discrete operations in turn, in a manner that may be helpful in understanding embodiments; however, the order of description should not be construed to imply that these operations are order-dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.).

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

Embodiments herein provide techniques for distributed key matching by a plurality of computation elements (e.g., including one or more processors). In embodiments, a key matching manager may receive a match request from an access point of a local area network (LAN) as part of an extensible authentication protocol over LAN (EAPOL) process associated with a client device. The match request may include an offered key provided by the client device and key information that was used to generate the offered key (e.g., a station nonce (SNonce) value generated by the client device, an access point nonce (ANonce) value generated by the access point, a media access control (MAC) address of the client device, a MAC address of the access point, a service set identifier (SSID) of the LAN and/or access point, and/or other information).

The key matching manager may determine a number of keys that are potentially valid for authentication with the LAN. For example, the key matching manager may request the number of valid keys from a service area information server. The key matching manager may determine indexing information based on the number of keys, the indexing information to allocate the keys into a plurality of partitions based on a portion (e.g., prefix) of the respective keys. In some embodiments, a size of the portion of the keys used for the indexing information (e.g., in bits) may be determined by the key matching manager to divide the keys into sub-groups of desired size that may be allocated to the respective partitions. For example, the size of the portion of the key may be determined based on the number of valid keys.

In various embodiments, the respective partitions may be assigned to different computational elements for matching against the offered key. In some embodiments, the indexing information may be determined based on computational capacity of the computational elements. Accordingly, different computational elements may be allocated different numbers of the valid keys and/or a different number of computational elements may be employed for the matching process depending on the respective computational capacities.

In various embodiments, the key matching manager may send the offered key, the indexing information for the respective partition, and the key information (e.g., SNonce value, ANonce value, etc.) to the computation elements to perform matching with the respective partitions of keys. If a match is successfully found, the key matching manager may receive an indication of the match (e.g., including the matched key) from the computation element that found the successful match.

While embodiments are described herein with reference to the EAPOL 4-step handshake process, the techniques described herein may be used for key matching in other processes or contexts, particularly when the set of valid keys have values (e.g., bit strings) that are randomly distributed.

FIG. 1 illustrates an example of an EAPOL 4-way handshake process 100 (hereinafter "process 100") in accordance with various embodiments. The process 100 may be performed by a client device 102 (e.g., supplicant) and an access point 104. In various embodiments, the process 100 may further include a key matching service 106 for offloading key matching, as further discussed below. One example of the key matching service 106 is discussed in further detail with respect to FIG. 2A.

The client device 102 may be provided with a pre-shared key (PSK) for establishing a connection with the access point 104. The access point 104 may support multiple PSKs (e.g., for the same SSID). For example, different PSKs may be used by different client devices 102 and/or groups of client devices 102 to access the network of the access point 104. In some embodiments, the PSK may be used to generate a pairwise master key (PMK). For example, the PMK may be generated based on the PSK and the SSID of the access point 104.

At 108 of the process 100, the client device 102 may generate a first random sequence (e.g., referred to as a station nonce (SNonce)). At 110 of the process 100, the access point 104 may generate a second random sequence (e.g., referred to as an access point nonce (ANonce)). At 112 of the process 100, the access point 104 may send a first frame (Frame 1) to the client device 102. Frame 1 may include the ANonce value generated by the access point 104.

The client device 102 may generate a pairwise transient key (PTK) based on the SNonce, the ANonce, and the PMK (which may be generated based on the PSK and SSID). In some embodiments, the PTK may be generated based further on a MAC address of the client device 102 and/or a MAC address of the access point 104. For example, the PTK may be a pseudo-random function (e.g., a hash function) of the SNonce, ANonce, PMK, the MAC address of the client device 102, and the MAC address of the access point 104. The client device 102 may additionally generate a message integrity check (MIC). The MIC may be generated, for example, based on a checksum of the Frame 2 message using the PTK.

At 114 of the process 100, the client device 102 may send a second frame (Frame 2) to the access point 104. Frame 2 may include the SNonce generated by the client device 102. In some embodiments, Frame 2 may further include the MIC and/or other information, such as a protocol, a replay counter, extension data, and/or key information.

At 116 of the process 100, the access point 104 may send a match request to the key matching service 106. The match request may include the ANonce value and some or all of the contents of Frame 2 (e.g., the SNonce value) to the key matching service 106. The match request may further include the MAC address of the access point 104, the MAC address of the client device 102, and/or the SSID of the LAN. The key matching service 106 may use this information to generate the MIC for each PMK and/or PSK and match the generated MIC to a set of valid keys that are valid for authentication. As described further with respect to FIG. 2A, the key matching service 106 may allocate the valid keys among multiple computation elements to search for a match with the PMK and/or PSK generated from the ANonce value, Frame 2 information, and/or other information (e.g., the MAC addresses of the access point 104 and/or client device 102, and/or the SSID of the LAN).

At 118 of the process 100, the key matching service 106 may send a match result to the access point 104, e.g., an indication of whether a match for the PMK and/or PSK was successfully found among the valid keys. Accordingly, the access point 104 does not need to perform the matching process itself, which is computationally intensive. In some embodiments, the match result at 118 may additionally include the PMK and/or PSK, and/or other information to identify the PMK and/or PSK. Thus, the access point 104 may not need to compute the PMK and/or PSK itself from the ANonce value and SNonce value.

At 120 of the process 100, the access point 104 may send a result message (e.g., referred to as Frame 3) to the client device 102. The result message may indicate whether the match was successful or not. If the match was successful, the result message may include additional information, such as a group temporal key (GTK), which may be generated based on a group master key (GMK).

At 122 of the process 100, the client device 102 may send an acknowledgement of the result message (e.g., referred to as Frame 4). If the match is successful, the client device 102 is authenticated by the process 100, and can thereafter access network services via the access point 104 (e.g., using one or more keys generated as part of the process 100).

Figure 2A:
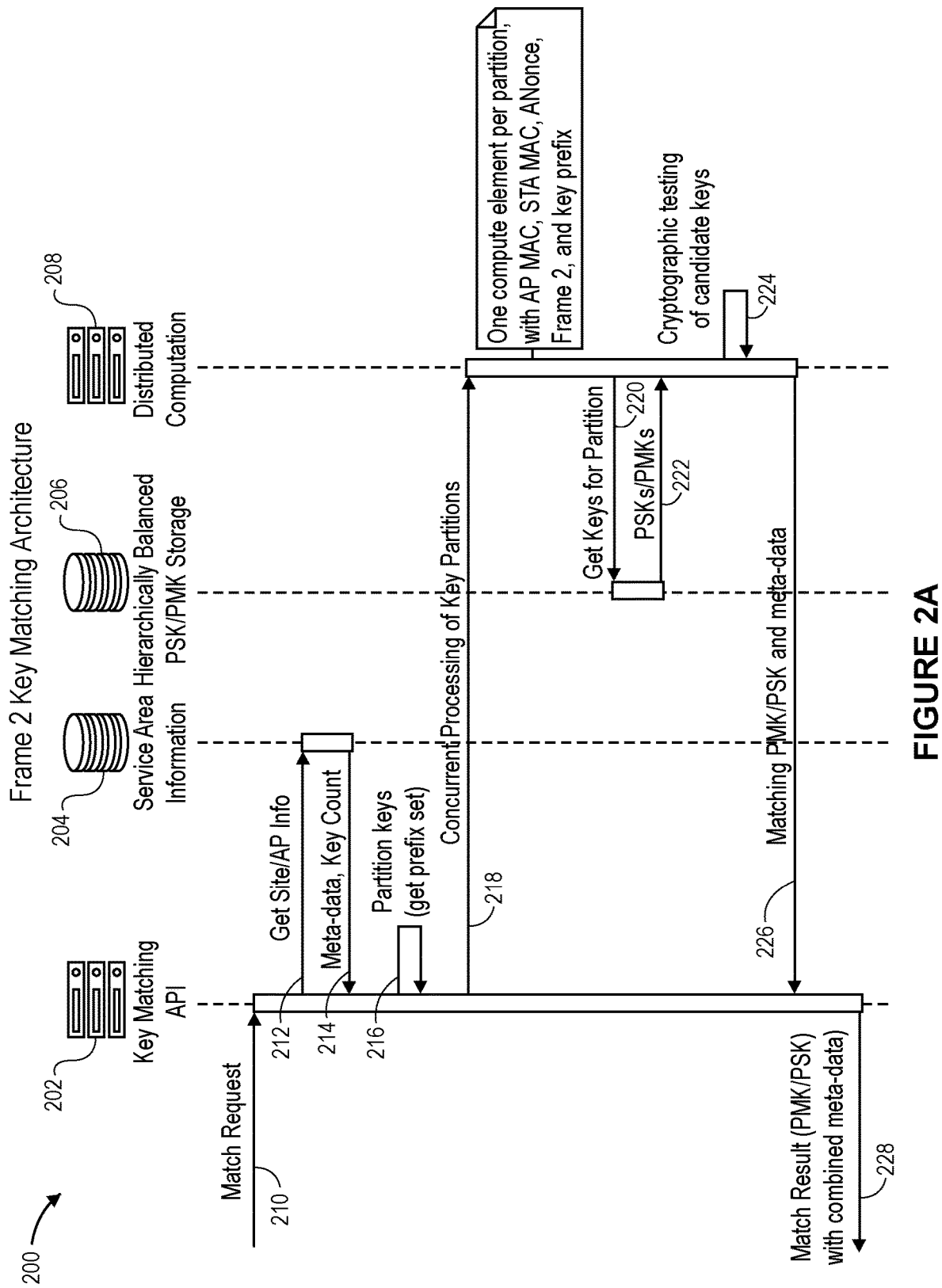
FIGS. 2A, 2B, and 2C illustrate examples of distributed key matching processes in accordance with various embodiments.

FIG. 2A illustrates a process 200 and an associated architecture for performing distributed key matching in accordance with various embodiments. The process 200 may be performed by the key matching service 106 of FIG. 1. The key matching architecture may include, for example, a key matching manager 202, a service area information server 204, a key storage server 206, and/or distributed computation elements 208. The key matching manager 202 may include, for example, an application programming interface (API). The distributed computation elements 208 may include a plurality of separate computation elements that each include one or more processors. In some embodiments, at least some of the computation elements 208 may be cloud-based.

The service area information server 204 may store information associated with the LAN, such as a number of keys associated with the SSID of the LAN. In some embodiments, the service area information server 204 may be combined with the key matching manager 202 or included in a separate device/entity. The service area information server 204 may store information on the sites that are allowed to make use of the EAPOL matching service, and the configuration of those sites. In addition to SSID and key counts, other tags and/or attributes (e.g., metadata) may be stored with the site information.

The key storage server 206 may store the valid keys (e.g., PSKs and/or PMKs) for the SSID/access point. In some embodiments, the key storage server 206 may be hierarchically organized by the PMK prefix.

At 210 of the process 200, the key matching manager 202 may receive a match request. The match request may be received from the access point of the LAN. For example, the match request may correspond to the match request at 116 of process 100. The match request may include the ANonce value generated by the access point, and frame 2 information provided from the client device (e.g., the SNonce value and/or other frame 2 information). The match request may further include other information needed to determine the PTK, PMK, and/or PSK, such as the MAC address of the client device and/or the MAC address of the access point.

At 212 of the process 200, the key matching manager 202 may send a request for information associated with the LAN to the service are information server 204. The request may include an identifier of the LAN, such as the SSID of the LAN.

At 214 of the process 200, the service area information server 204 may send the key matching manager 202 a response to the request. The response may include a number of valid keys for the LAN/SSID. In some embodiments, the response may include additional information, such as a status of the LAN (e.g., an indication of whether a site was found and/or metadata intended to influence the processing of match requests or the content of the response to the request (in addition to matching keys)), and/or metadata associated with the LAN.

At 216 of the process 200, the key matching manager 202 may determine indexing information based on the number of keys. The indexing information may allocate the keys into a plurality of partitions based on a prefix of the key (e.g., the first one or more bits and/or bytes of the key). While the process 200 is described herein with respect to the prefix of the key, it will be understood that another portion of the key may alternatively be used to partition the keys.

In various embodiments, the key matching manager 202 may not have or receive the keys themselves. However, the values of the PMKs are randomly distributed by the encryption operations that produce them. Accordingly, the key matching manager 202 uses this property of the PMKs to distribute the PMKs into partitions based on the prefix of the keys.

In some embodiments, the indexing information may allocate keys to partitions based further on a computational capacity of the distributed computation elements. For example, the key matching manager 202 may determine a maximum number of keys that individual computation elements can handle for the matching process while meeting a latency requirement for providing the match result. In some embodiments, the maximum number of keys may be a predefined value (e.g., based on the configuration of the computation elements and/or other parameters of the matching system). In some embodiments, the computation elements may have the same computational capacity (e.g., maximum number of keys that may be handled within the latency requirement). The key matching manager 202 may determine the minimum number of computation elements that may be used for matching the offered key based on the number of valid keys and the maximum number of keys that may be handled by each computation element. The key matching manager 202 may determine a size of the prefix used to partition the valid keys based on the determined minimum number of computation elements. For example, the minimum number of computation elements that are needed may be determined by dividing the number of valid keys by the maximum number of keys that may be handled by each computation element, and then rounding up to the next integer. For example, if there are 150 valid keys and the maximum number of keys to be handled by each computation element is 50, then 3 computation elements are needed. However, if there are 151 valid keys (or 152-200), then 4 computation elements are needed.

In some embodiments, the determined size of the prefix may correspond to a bit sequence that with a lowest number of possible values that is greater than the minimum number of computation elements that are needed. For example, if it is determined that 4 computation elements are needed, then a 2-bit prefix (with 4 possible values) may be used to partition the valid keys into 4 partitions to be handled by the 4 computation elements. If it is determined that 5 computation elements are needed (or 6, 7, or 8 computation elements), then a 3-bit prefix (with 8 possible values) may be used to partition the valid keys into 8 partitions to be handled by the 8 computation elements.

For example, the size of the prefix may be determined based on a base-N log function of the minimum number of computation elements that are needed. The value of N may correspond to the number of distinct values for each element (e.g., bit) of the prefix (e.g., N=2 for a binary key). The result of the base-N log function may be rounded up to the next integer to determine the size of the prefix.

Alternatively, in some embodiments, different distributed computation elements may have different computational capacities (e.g., based on a configuration of the computational element and/or a current processing load of the computational element). The key matching manager 202 may allocate the keys to partitions to balance the processing load, e.g., to optimize overall throughput/latency.

The key matching manager 202 may determine the computational capacity of the distributed computation elements based on traffic monitoring information and/or capability information associated with the individual computation al elements 208. The computational capacity may include one or more parameters, such as network performance metric(s), invocation latency, and/or processing capacity/capability.

In various embodiments, the key matching manager 202 may determine a length of the prefix used to partition the keys based on the number of keys and/or the computational capacity of the distributed computation elements. The length of the prefix dictates the granularity (e.g., number of one or more keys) with which the corresponding keys may be assigned to groups. Thus, the key matching manager 202 may determine the desired granularity for distribution of the valid keys to be searched by each of the number of computation elements 208, and determine the length of the prefix based on the desired granularity. When the computational capacity of the computation elements is the same (e.g., when the computational capacity is predefined), each value of the prefix may be assigned to a different computation element. However, in some embodiments in which the computational capacity is different among the computation elements and/or determined dynamically, one or more computation elements may be assigned more than one prefix value.

In various embodiments, the key matching manager 202 may generate index information that includes the one or more prefix values (e.g., with the determined length) that are assigned to each partition (and thus a different computation element 208). For example, the index information may include a list of one or more prefixes and/or a range of prefixes assigned to a respective computation element 208.

At 218 of the process 200, the key matching manager 202 may send match instructions (e.g., a request for concurrent processing of key partitions) to the plurality of computation elements 208. The match instructions may include the key (e.g., PMK and/or PSK) offered by the client device to be matched, and/or information to enable the individual computation elements 208 to determine the key to be matched. For example, the match instructions may include the ANonce value, the SNonce value, SSID of the LAN, MAC address of the client device (STA MAC) and/or MAC address of the access point (AP MAC), and/or other information needed to determine the key to be matched. The individual computation elements 208 may determine the offered key to be matched based on the information in the match instructions.

In various embodiments, the match instructions may further include the index information to indicate to each of the computation elements 208 the partition of valid keys (e.g., PMKs and/or PSKs) that the computation element 208 is to attempt to match with the offered key. For example, as discussed above, the index information may indicate a list and/or range of the one or more prefixes of valid keys for the respective partition.

At 220 of the process 200, the individual computation elements 208 may request the keys for the respective partitions from the key storage server 206. The request may indicate the one or more prefixes (e.g., list or range) for which associated keys are requested. The request may further include identification information associated with the LAN (e.g., SSID, access point information, site information, and/or location information). The key storage server 206 may provide the requested keys to the respective computation elements 208 at 222 of the process 200.

In various embodiments, key storage server 206 may enable efficient retrieval of the keys by scope (e.g., access point, site, and/or location) and prefix. For example, the key storage server 206 may implement relational database management storage (RDBMS), non-relational table storage, and/or hierarchical object storage. In some embodiments, the key storage server 206 may provide an ordered mapping from string keys to string values.

At 224 of the process 200, each of the individual computation elements 208 may attempt to match the offered key to the partition of valid keys assigned to the respective computation element. The matching may be performed, for example, by a cryptographic testing process, such as calculating a checksum of the offered key and comparing it to a checksum of individual valid keys. If the checksum of the offered key matches a checksum of a valid key, then the computation element 208 determines that there is a match.

At 226 of the process 200, one or more of the computation elements 208 may provide match information to the key matching manager 202. For example, the computation element 208 that found a successful match may send match information that indicates the match was successful. The match information may further include the matching key (e.g., PMK and/or associated PSK) and/or other information to enable the key matching manager 202 and/or access point to determine the matching key. The match information may be provided when the match is found (as opposed to continuing to search the remaining keys prior to sending the match information). This may improve the response time of the matching process.

In some embodiments, the computation elements 208 that do not find a successful match for the offered key may send match information to the key matching manager 202 to indicate that the match was unsuccessful.

At 228 of the process 200, the key matching manager 202 may send a match result (e.g., to the access point). The match result may correspond to the match information provided by the key matching service 106 to the access point 104 at 118 of the process 100. The match result may include some or all of the match information provided by the computation element 208 that found a successful match (e.g., the matching key and/or other information to enable determination of the matching key).

Accordingly, the processes 100 and/or 200 and associated architecture may offload key matching from the access point, thereby reducing the required complexity/cost of the access point. Additionally, the distribution of matching among the plurality of computation elements enables the cryptographic computations to be performed in parallel, which significantly improves response times compared with a system that uses the same processing resources to match the offered key against all of the valid keys. Additionally, the number of keys in each partition, the number of partitions, and/or the distribution of keys among the different partitions may be determined to optimize performance and/or meet certain metrics (e.g., latency of the matching process). The processes 100 and/or 200 and associated architecture may improve performance (e.g., latency) and/or enable increased numbers of valid keys to be used compared with prior systems.

End-to-End Batching

In some embodiments, networking hardware (access points or controllers) may interact with the key matching service via RADIUS, which is a UDP protocol. Embodiments of the present disclosure may also operate in conjunction with other UDP protocols or other suitable communication protocols. The nature of RADIUS is such that authentication requests (aka. Access-Request) are received as asynchronous, stand-alone messages. These messages may arrive at a very high rate when authentication is centralized (e.g., in the cloud), which may be the case with some embodiments.

Existing RADIUS server software (e.g., FreeRADIUS and Microsoft NPS/IAS) implements a wide variety of RADIUS features. Some of those features require stateful message processing, which has led to implementations that include a serialized queue of messages that are processed in order, with each response being sent before processing of the next message begins. While efficient, and useful in support of complex protocol variants like EAP-TLS, this "one at a time" message process imposes economic and scalability constraints where it is unnecessary.

Embodiments of the present disclosure address these and other issues by asynchronously processing batches of messages to relieve the constraints imposed by serial processing. Among other things, by processing multiple messages in accordance with some embodiments provides an economics of scale realized by reusing the computational resources (e.g., memory, network and CPU). The overall result is that fewer requests are made to each layer of the system (e.g., in FIG. 2B, RADIUS layer 234, key-matching API 202, and concurrent matching workers 240), and the resulting computation capacity and memory used is reduced proportionally to the size of batches. In some cases, this can result in a cost savings of up to 99% over a similar system based on "one at a time" message processing.

Figure 2B:
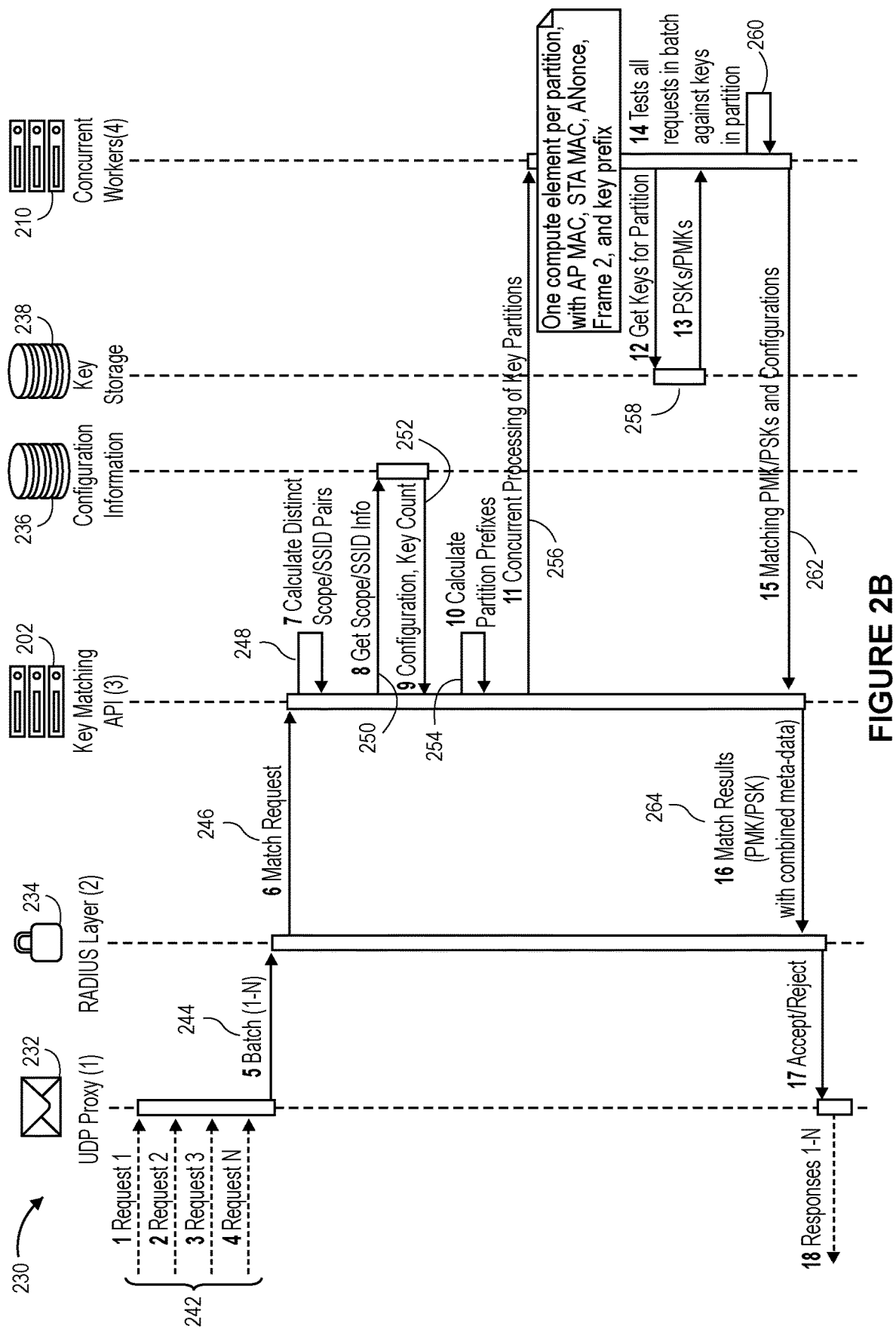

FIG. 2B illustrates an example of a key matching process 230 utilizing batching in accordance with various embodiments. In this example, at 242, UDP messages are received by a UDP Proxy Layer 232. The UDP Proxy Layer 232 may receive individual messages from a plurality of access points and buffer them internally until a pre-configured number of messages (or predetermined period of elapsed time) has been reached. The buffered messages are then passed down, at 244, to the RADIUS layer 234 as a single batch.

The interstitial RADIUS Layer 234 transforms binary UDP packet data to semantic RADIUS message content. Messages that are invalid are removed from the batch, as are messages for which there are known responses (cached or canned). The remaining transformed messages are sent, at 246, to the Matching API layer 202, and the responses returned to the UDP Layer at 264.

The Matching API layer 202 determines (at 248, 250, 252, and 254) the largest number of PSKs to be searched based on the Scope and SSID pairs, distinct scope/SSID pairs, configuration information (e.g. from configuration server 236), and partition prefixes represented in the batch of requests. The matching API layer 202 then sends, at 256, the messages and appropriate key partition prefix to the set of concurrent matching workers 240 needed to search that number of keys in the designed (configured) time.

At 258, each matching worker instance retrieves from Key Storage 238 the set of PSKs matching it's assigned prefix. Then, at 260, each key in the batch is compared against that set for potential matches, which are returned (at 262 and 264) to the Coordinator (key matching API 202), the RADIUS layer, and finally to the UDP layer which sends the responses back to the access point.

Embodiments of the present disclosure can provide effective batching based on its knowledge of the segmentation of keys (PSKs) in the Key Storage service 238. The approach to key partitioning taken by embodiments of the present disclosure (scope+ssid+computed prefix match) allows grouping of requests into sets based on scope and SSID.

Attribute-Based Hinting

In some embodiments, among the use cases involving very large numbers of PSKs are cases involving large, widely distributed networks where the population of devices that may associate is likewise widely distributed. In other words, networks with very large numbers of potential clients are geographically distributed. Likewise, because of physical limitations, the number of devices that may connect to a single access point is also relatively small. Embodiments of the present disclosure may address this by identifying the small set of PSKs most likely to be matched in an initial connection to help better support large numbers of PSKs.

Figure 2C:
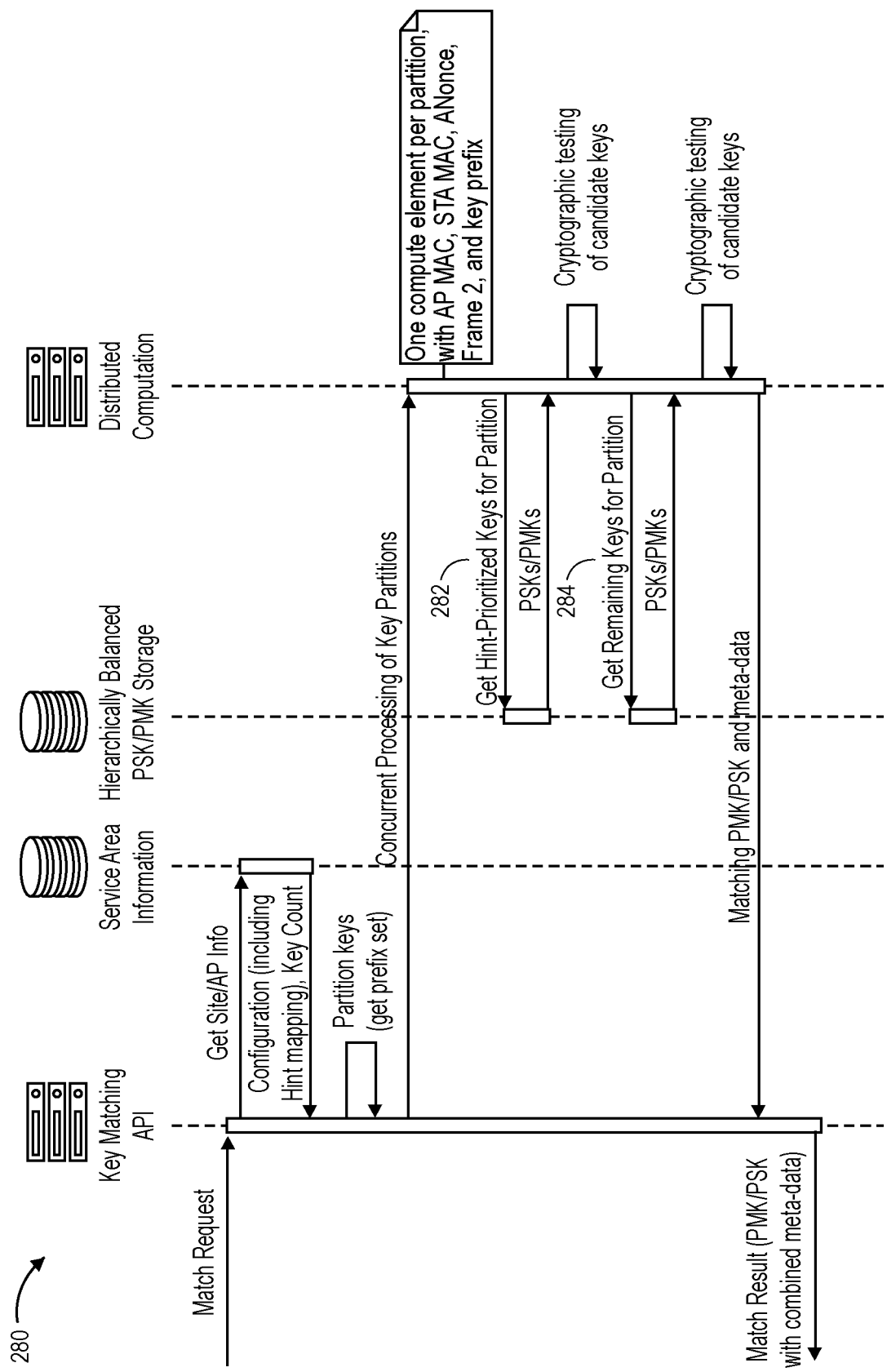

FIG. 2C illustrates an example of a key-matching process 280 utilizing attribute-based "hinting" to support use cases involving large numbers of PSKs as described above. In this example, the components are as described above with reference to FIG. 2A with some notable improvements. For example, in some embodiments the Key Storage service may be improved to allow storage of arbitrary string tags (e.g., single named labels) as well as attributes (e.g., key/value pairs). These data items may be provided when PSKs are added to the storage, or added/updated/removed from existing PSKs.

In some embodiments, when a matching request is made the tags and attributes associated with the matching PSK are included in the response. Among other things, these data items also help provide a way to configure PSK-specific connection properties such as VLAN, bandwidth limits, session time, etc. as well as store application-specific data with PSKs for use by external systems.

A matching request (e.g., request for concurrent processing of key partitions in process 280) may contain arbitrary "extra" information that isn't utilized for the core matching mechanism described previously. This extra information may be intrinsic to the protocol used to communicate with the service (IP addresses, ports, etc.) or encoded in the content of the messages (HTTP headers, RADIUS AVPs and VSAs).

In some embodiments, the Key Matching API may be enhanced from FIG. 2A to allow configuring rules that allow "extra" information to be mapped to Attributes stored on PSKs.

Upon receiving a matching request by one or more distributed computation component, the mapping may be used to form a query filter to identify PSKs which are "most likely" (e.g., having a likelihood or probability above a predetermined threshold) to be matched by comparing the value of the "extra" data to the values of identified attributes. A "fuzzy match" may be used for the comparison to provide PSK prioritization and an "exact match" may be used to provide filtering of potentially matching PSKs. At 282, this subset of PSKs having the highest likelihood of matching is retrieved and searched first. If no match is found, then, at 284, the remainder of the PSKs are retrieved and searched.

In this manner, embodiments of the present disclosure provide for order matching comparisons such that PSKs likely to be a match are searched first, reducing the time to find a match. Additionally, embodiments of the present disclosure help to filter the PSKs to reduce the overall number needed to be searched.

In one specific example, in an integration with the Key Matching service via RADIUS, requests include the network identity of the access point (BSSID). To make use of Hints, an Attribute could be added to PSKs and hold the value of the BSSID most likely to be used (perhaps called "Home AP"). Then, the matching service could be configured with a "Hint" that the BSSID in the RADIUS request should be mapped to the "Home AP" attribute of the PSK. When matching requests are received, the query to the Key Storage service is then modified to first identify PSKs where the "Home AP" matches the AP's BSSID, and only search other keys if no match is found among them.

Active VLAN Management

In some embodiments, referring again to FIGS. 1 and 2A, when the key matching service responds to a key-matching request with a positive response (e.g., by supplying the matched key back to the requesting device or service), it may, if configured to do so, include a VLAN (virtual LAN) value with the response. The system having requested the key-match will then apply the supplied VLAN value to all network traffic generated using the WPA-2 key in question, thus segregating the traffic on the network from each key or group of keys into discrete virtual networks.

IEEE 802.1Q specifies that the maximum number of VLANs on a given Ethernet network is 4,094. Some embodiments of the present disclosure may provide cloud-based access management to networks wherein a distinct VLAN is assigned to each user of the network. A user may be assigned one or more WPA-2 keys; each key may have its own unique VLAN and some or all of the keys may share the same VLAN, depending on system configuration.

Accordingly, managing the availability of VLANs as network users are on-boarded and off-boarded is one issue for embodiments of the present disclosure. Traditionally, there are two primary methods to manage VLANS: 1) static mapping; 2) dynamic assignment from a pool. In the static mapping method, a network is divided into logical "units," such as apartments, and every available unit is assigned a VLAN value in the static map. Each network user is then assigned to a logical unit and any keys generated for or assigned to the user in that unit will use the VLAN value mapped to that unit in the map. In the dynamic pool method, there is no map. Instead, each user of the network is assigned a VLAN value from a defined pool of available values (which can't exceed 4094 total VLANs). When a user is on-boarded a VLAN from the pool is assigned to them (and is included in the EKMS key-matching response); that VLAN is no longer available to be assigned to other users. When the user is off-boarded (and their key disabled), the VLAN that had been assigned to them is released back to the pool and is once again available to be assigned to another network user. This 1:1 relationship between VLANs and network users limits the number of users who can be onboarded to the network to the number of VLANs that are available in the pool.

Embodiments of the present disclosure help address the above issues. For example, in some embodiments when using the dynamic pool method with the key matching system, it is not necessary to leave a VLAN assigned to a key that is not actively in use to connect a device to the network. Accordingly, the system may only assign a VLAN to a key from the pool when the key becomes active and then frees the VLAN back to the pool when the key becomes inactive. This allows for there to be more users of the network than there are VLANs available, so long as there are no more users who are active than there are available VLANs.

In some embodiments, when a user is on-boarded to the network, their unique key is generated and added to the key matching service so that it is available for matching should the user decide to connect a device but a VLAN value is not assigned to it. When a device connects to the network using the user's key, the key matching request is sent to the key matching service. If the key matching service finds a match, it proceeds in one of the following ways:

(1) If no VLAN has been assigned to the key, the system assigns a VLAN from the pool, stores the VLAN for use in subsequent key match requests, and responds to the requesting service with the matched key and the VLAN attribute; or (2) If a VLAN has previously been assigned to the key and is stored for future use EKMS responds to the requesting service with the matched key and the previously-assigned VLAN value.

In this manner, because the key matching service responds to subsequent key matching requests with the previously-assigned VLAN (where one exists), network traffic from all of a user's active devices will be tagged with the same VLAN while they are active.

If a key becomes inactive, the system may remove the VLAN assignment for that key and add it back to the pool, thus freeing the VLAN to be assigned to a different user of the network. If, after a period of inactivity, a key is once again used to join the network, the system will once again assign a VLAN from the pool of available VLANs and store it for future requests.

The cycle of assigning VLANs to a key when they are active and freeing them back to the pool when they become inactive may continue for as long as the key is valid for matching in the key matching service.

Figure 3:
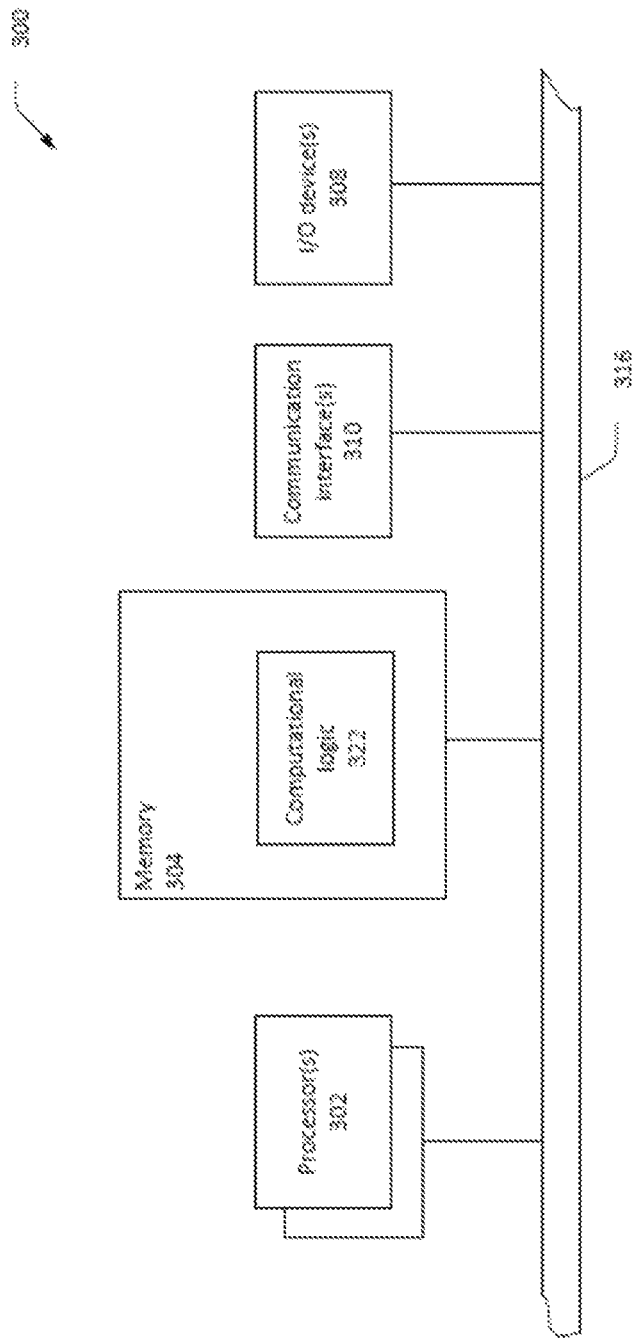
FIG. 3 illustrates an example computing device to implement various aspects of the present disclosure.

FIG. 3 illustrates an example computing device to implement various aspects of the present disclosure, including components and operation flows/algorithmic structures described herein. In various embodiments, the computing device 300 may be implemented as the client device 102, access point 104, and/or one or more components of key matching service 106 shown and described with respect to FIG. 1. The computing device 300 may additionally or alternatively be implemented as the key matching manager 202, the service area information server 204, the key storage server 206, and/or distributed computation elements 208 shown and described with respect to FIGS. 2A and 2C, as well as any suitable component depicted in FIG. 2B.

The computing device 300 may include one or more processors or processors 302 and memory 304. For the purpose of this application, including the claims, the terms "processor" and "processor cores" may be considered synonymous, unless the context clearly requires otherwise.

The memory 304 may include any combination of volatile and non-volatile memory. For example, the memory 304 may include random access memory (for example, dynamic random access memory, synchronous dynamic random access memory, static random-access memory, non-volatile random-access memory etc.), read-only memory (for example, mask read-only memory, programmable read-only memory, erasable programmable read-only memory, electrically erasable programmable read-only memory, flash memory, etc.), caches, etc. Some elements of the memory 304, for example, mass storage may be physically separate or remote from the computing device 300.

The memory 304 may be employed to store component logic 322 including, for example, working or permanent copies of programming instructions, to implement operations associated with described components (for example, client device 102, access point 104, key matching service 106, key matching manager 202, service area information server 204, key storage server 206, and/or distributed computation elements 208). The various elements of the component logic 322 may be implemented by assembler instructions supported by processor(s) 302 or high-level languages, such as, for example, C and/or any other suitable high-level language that can be compiled into such instructions.

The permanent copy of the programming instructions may be placed into permanent storage devices in the factory, or in the field through, for example, a tangible distribution medium (not shown), or through communication interface 310 (from a distribution server (not shown)). That is, one or more distribution media having an implementation of the operation flows/algorithmic structures described herein may be employed to distribute the programming instructions and program various computing devices.

The processors 302 may include any combination of processing circuitry to execute the computational logic 322 from the memory 304 to implement various aspects of the embodiments described herein. The processors 302 may include central processing units, graphics processing units, digital signal processors, accelerators etc. The processors 302 may be implemented on a common motherboard, dedicated cards, etc. The processors 302 may further include various units dedicated to specific processing tasks such as, but not limited to, power management units, bus interfaces, memory controllers, device drivers, display interfaces, compute/graphics arrays, registers, combinational logic, etc.

The computing device 300 may further include input/output (I/O) devices 308 (such as display, keyboard, cursor control, remote control, gaming controller, image capture device, and so forth).

The computing device 300 may further include communication interface(s) 310 that include one or more hardware devices that allow the computing device 300 to communicate with other devices (e.g., the devices shown and described with respect to FIG. 1 and FIG. 2). In embodiments, each of the communication interfaces 310 may include one or more processors (for example, baseband processors, etc.) that are dedicated to a particular wireless communication protocol (for example, Wi-Fi and/or IEEE 802.11 protocols), a cellular communication protocol (for example, Long Term Evolution (LTE), 5G, and the like), a wireless personal area network (WPAN) protocol (for example, IEEE 802.15.4-802.15.5 protocols, Bluetooth or Bluetooth low energy (BLE), etc.), or a wired communication protocol (for example, Ethernet, Fiber Distributed Data Interface (FDDI), Point-to-Point (PPP), etc.). The communication interfaces 310 may also include hardware devices that enable communication with wireless/wired networks and/or other computing devices using modulated electromagnetic radiation through a solid or non-solid medium. Such hardware devices may include switches, filters, amplifiers, antenna elements, receptacles/ports to accept plugs/connectors, and/or and the like to facilitate the communications over the air or through a wire by generating or otherwise producing radio waves to transmit data to one or more other devices, and converting received signals into usable information, such as digital data, which may be provided to one or more other components of computing device 300.

The elements of the computing device 300 may be coupled to each other via internal connection interface 316, which may represent one or more buses or other connections. In the case of multiple buses, they may be bridged by one or more bus bridges (not shown).

The number, capability and/or capacity of the elements of the computing device 300 may vary, e.g., depending on how the computing device 300 is used. Their constitutions are otherwise known, and accordingly will not be further described.

Figure 4:
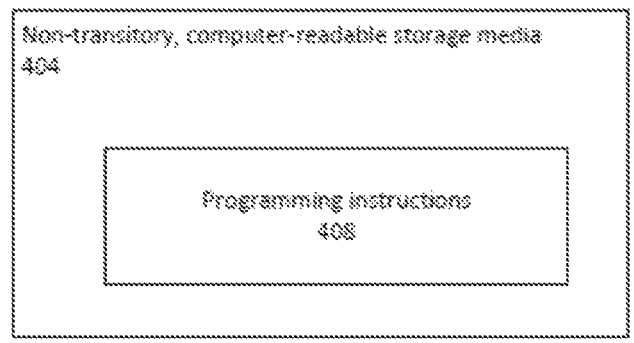
FIG. 4 is a block diagram illustrating computer-readable storage media and programming instructions to perform any one or more of the methodologies discussed herein.
Figure 5B:
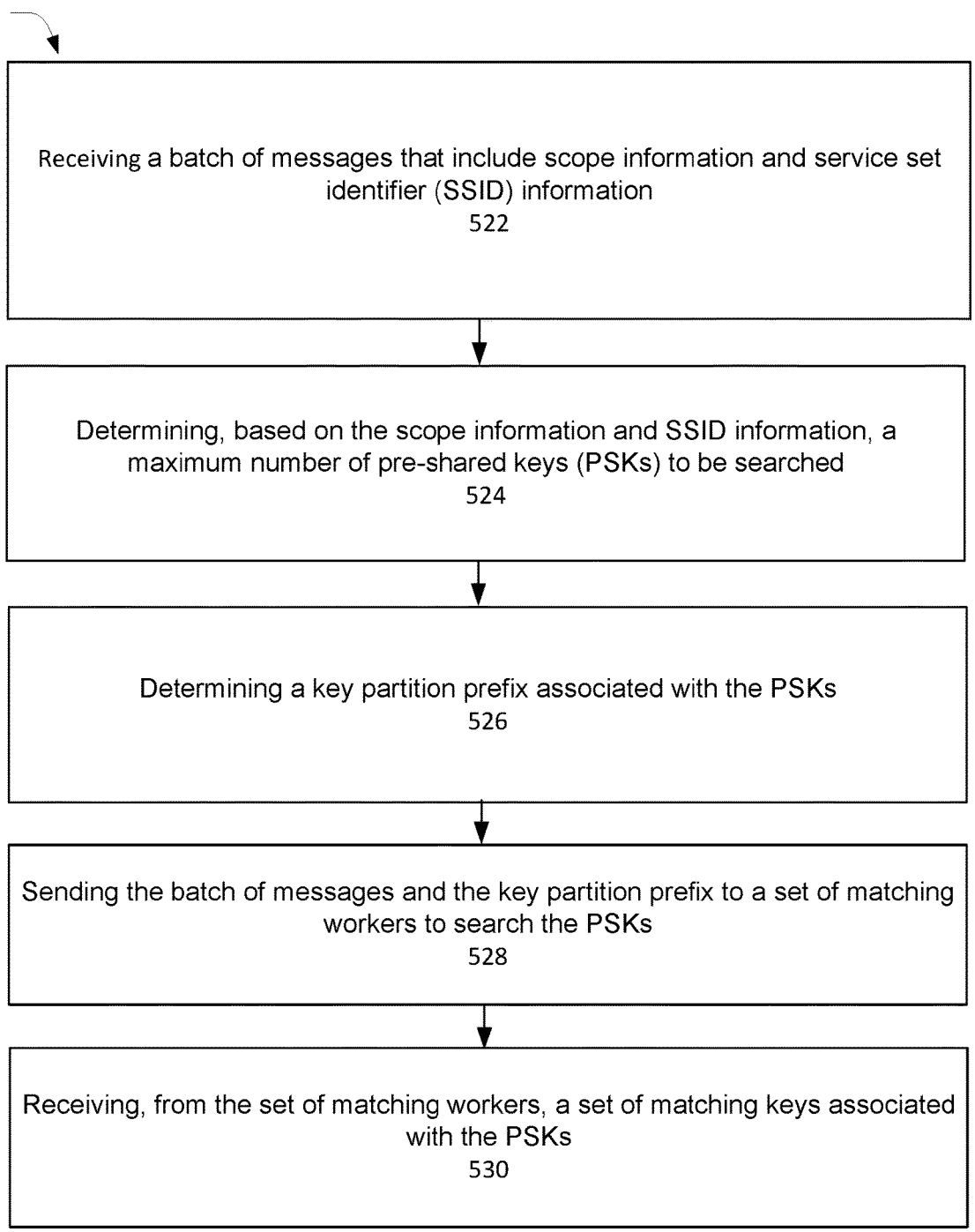
Figure 5C:
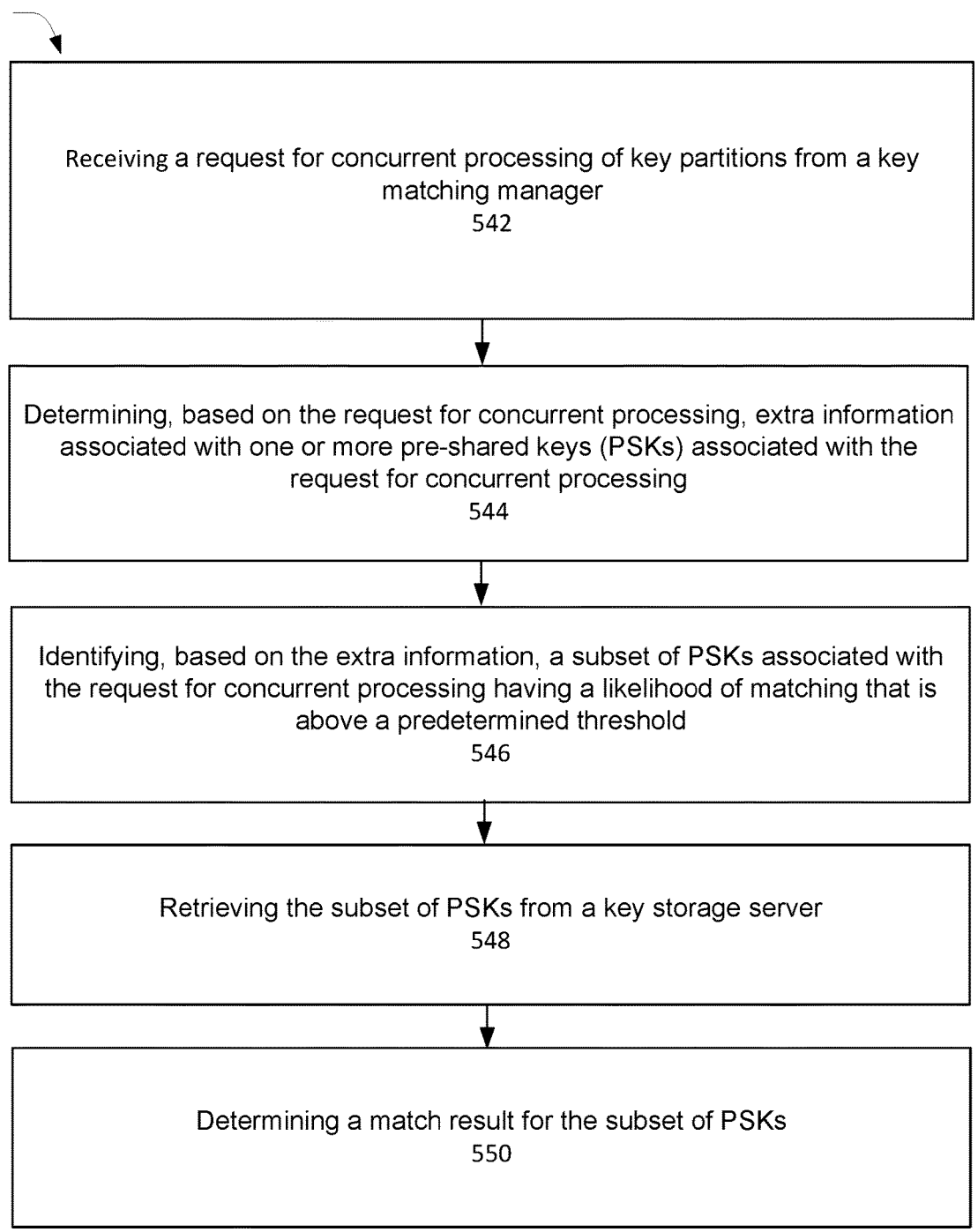

FIG. 4 illustrates an example of at least one computer-readable storage medium 404 having instructions configured to practice all or selected ones of the operations associated with techniques described herein. As illustrated, least one computer-readable storage medium 404 may include a number of programming instructions 408. Programming instructions 408 may be configured to enable a device, for example, computing device 300, in response to execution of the programming instructions, to perform, for example, various operations of process 100 and/or process 200. In alternate embodiments, programming instructions 408 may be disposed on multiple computer-readable storage media 404 instead.

Computer-readable media (including least one computer-readable media), methods, apparatuses, systems and devices for performing the above-described techniques are illustrative examples of embodiments disclosed herein. Additionally, other devices in the above-described interactions may be configured to perform various disclosed techniques.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. One or more non-transitory computer-readable media storing instructions that, when executed by one or more processors, cause a computing device to:
   receive a match request from an access point of a local area network (LAN) as part of an extensible authentication protocol over LAN (EAPOL) process associated with a client device, the match request including an offered key provided by the client device, a station nonce (SNonce) value generated by the client device, and an access point nonce (ANonce) value generated by the access point;
   determine a number of keys that are potentially valid for authentication with the LAN;
   determine indexing information based on the number of keys, the indexing information to allocate the keys into a plurality of partitions based on a portion of the respective keys;
   send the offered key, the indexing information for the respective partitions, the SNonce value, and the ANonce value to a plurality of computation elements to perform matching with the respective partitions of keys, wherein the client device is not included in the plurality of computation elements; and
   receive, from a first computation element from the plurality of computation elements, an indication of a match.

2. The one or more non-transitory computer-readable media of claim 1, wherein the indexing information is determined based further on a computational capacity of the plurality of computation elements.

3. The one or more non-transitory computer-readable media of claim 1, wherein the portion of the respective keys is a prefix of the respective keys.

4. The one or more non-transitory computer-readable media of claim 1, wherein the media further stores instructions to cause the computing device to determine a size of the portion of the key based on the number of keys.

5. The one or more non-transitory computer-readable media of claim 4, wherein the media further stores instructions to cause the computing device to:
   determine a minimum number of computation elements needed to perform the matching based on the number of keys; and
   determine a size of the portion of the key based on a base-N log function of the minimum number, wherein N is a number of possible values of individual elements of the portion of the key.

6. The one or more non-transitory computer-readable media of claim 5, wherein the individual elements are bits and N is 2.

7. The one or more non-transitory computer-readable media of claim 1, wherein the SNonce value and the ANonce value are included in key information used to generate the offered key, and wherein the key information further includes one or more of: a media access control (MAC) address of the access point, a MAC address of the client device, or a service set identifier (SSID) of the LAN.

8. The one or more non-transitory computer-readable media of claim 1, wherein the keys are pairwise master keys (PMKs) or pre-shared keys (PSKs) and:
   the PMKs are associated with a same SSID and different PSKs; or
   the indication of the match includes a matching PSK or PMK.

9. The one or more non-transitory computer-readable media of claim 1, wherein the media further stores instructions to cause the computing device to provide a match result to the access point based on the indication of the match.

10. The one or more non-transitory computer-readable media of claim 9, wherein the media further stores instructions to cause the computing device to determine a value associated with a virtual local area network (VLAN), wherein the value associated with the VLAN is included in the match result.

11. The one or more non-transitory computer-readable media of claim 10, wherein determining the value associated with the VLAN includes:
   determining no VLAN is currently assigned to a key; and
   assigning a VLAN to the key from a pool for subsequent key match requests.

12. The one or more non-transitory computer-readable media of claim 10, wherein determining the value associated with the VLAN includes identifying a VLAN that is currently assigned to a key.

13. One or more non-transitory computer-readable media storing instructions that, when executed by one or more processors, cause a computing device to:
   receive a batch of messages that include scope information and service set identifier (SSID) information;
   determine, based on the scope information and SSID information, a maximum number of pre-shared keys (PSKs) to be searched;
   determine a key partition prefix associated with the PSKs;
   send the batch of messages and the key partition prefix to a set of matching workers to search the PSKs; and
   receive, from the set of matching workers, a set of matching keys associated with the PSKs.

14. The one or more non-transitory computer-readable media of claim 13, wherein the PSKs have a common scope and SSID.

15. The one or more non-transitory computer-readable media of claim 13, wherein the batch of messages originate from a plurality of access points.

16. The one or more non-transitory computer-readable media of claim 13, wherein the batch of messages are received from a user datagram protocol (UDP) layer.

17. The one or more non-transitory computer-readable media of claim 16, wherein the instructions are further to cause the computing device to: send the set of matching keys associated with the PSKs to the UDP layer.

18. One or more non-transitory computer-readable media storing instructions that, when executed by one or more processors, cause one or more computation elements to:
   receive a request for concurrent processing of key partitions from a key matching manager;
   determine, based on the request for concurrent processing, extra information associated with one or more pre-shared keys (PSKs) associated with the request for concurrent processing;
   identify, based on the extra information, a subset of PSKs associated with the request for concurrent processing having a likelihood of matching that is above a predetermined threshold;
   retrieve the subset of PSKs from a key storage server; and
   determine a match result for the subset of PSKs.

19. The one or more non-transitory computer-readable media of claim 18, wherein the extra information includes information that is: associated with a communication protocol associated with the request for concurrent processing, included in a hypertext transport protocol (HTTP) header, included in an attribute value pair (AVP), or included in a vendor-specific attribute (VSA).

20. The one or more non-transitory computer-readable media of claim 18, wherein the extra information includes a basic server set identifier (BSSID) associated with an access point.

21. The one or more non-transitory computer-readable media of claim 18, wherein identifying the subset of PSKs includes comparing a respective attribute in each respective PSK to the extra information.

22. The one or more non-transitory computer-readable media of claim 18, wherein determining the match result for the subset of PSKs includes finding at least one match within the subset of PSKs.

23. The one or more non-transitory computer-readable media of claim 18, wherein determining the match result for the subset of PSKs includes finding no matches within the subset of PSKs, and wherein the memory further stores instructions to cause the one or more computation elements to:
   retrieve a remainder of PSKs from the key storage server; and
   determine a match result for the remainder of PSKs.

\* \* \* \* \*